United States Patent

[11] 3,584,544

| [72] | Inventor | Robert W. Haberman<br>33 Dapplegray Lane, Rolling Hills Estates, Calif. 90274 |
|---|---|---|
| [21] | Appl. No. | 746,443 |
| [22] | Filed | July 22, 1968 |
| [45] | Patented | June 15, 1971 |

[54] LOCKING MECHANISM
10 Claims, 5 Drawing Figs.

[52] U.S. Cl. ................................................ 92/24,
74/531, 92/28
[51] Int. Cl. ................................................ F15b 15/26
[50] Field of Search ........................................ 92/24, 18,
28, 19, 27; 188/67; 192/114; 64/30 R; 74/531

[56] References Cited
UNITED STATES PATENTS

| 2,768,610 | 10/1956 | Lieser | 92/24 X |
| 2,866,315 | 12/1958 | Schakel | 92/24 X |
| 2,971,497 | 2/1961 | De Vost | 92/24 |
| 3,217,609 | 11/1965 | Royster | 92/24 |
| 3,251,278 | 5/1966 | Royster | 92/24 X |
| 3,267,819 | 8/1966 | Valentine et al. | 92/24 |
| 3,342,111 | 9/1967 | Royster | 92/24 |
| 3,410,610 | 11/1968 | Cumming | 92/24 X |

*Primary Examiner*—Martin P. Schwadron
*Assistant Examiner*—Leslie J. Payne
*Attorney*—Fulwider, Patton, Rieber, Lee & Utecht ABSTRACT: A locking mechanism within a housing defining a cylindrical chamber having a frustoconical stop surface projecting inwardly from the wall thereof. A hydraulic operator reciprocable in the chamber has an axial bore and at least a pair of roller-receiving slots extending radially outwardly from said bore, the outer ends of said slots being registered with the stop surface when the operator is in position to be locked relative to said housing. A pair of elongated, convexly curved rollers are movable into and out of said slots while disposed transversely to the axis of the operator to effect elongated line contact with the frustoconical stop surface to lock the operator. An actuator piston is reciprocable in the axial bore of the operator to position the locking rollers radially and includes a pair of oppositely disposed bearing surfaces which, in the locking position of the piston, register with the radially inner ends of said slots. Carrier segments reciprocate in the slots and carry the locking rollers at their outer ends and actuating rollers on their inner ends engaged by the bearing surfaces on the actuator piston.

PATENTED JUN 15 1971
3,584,544
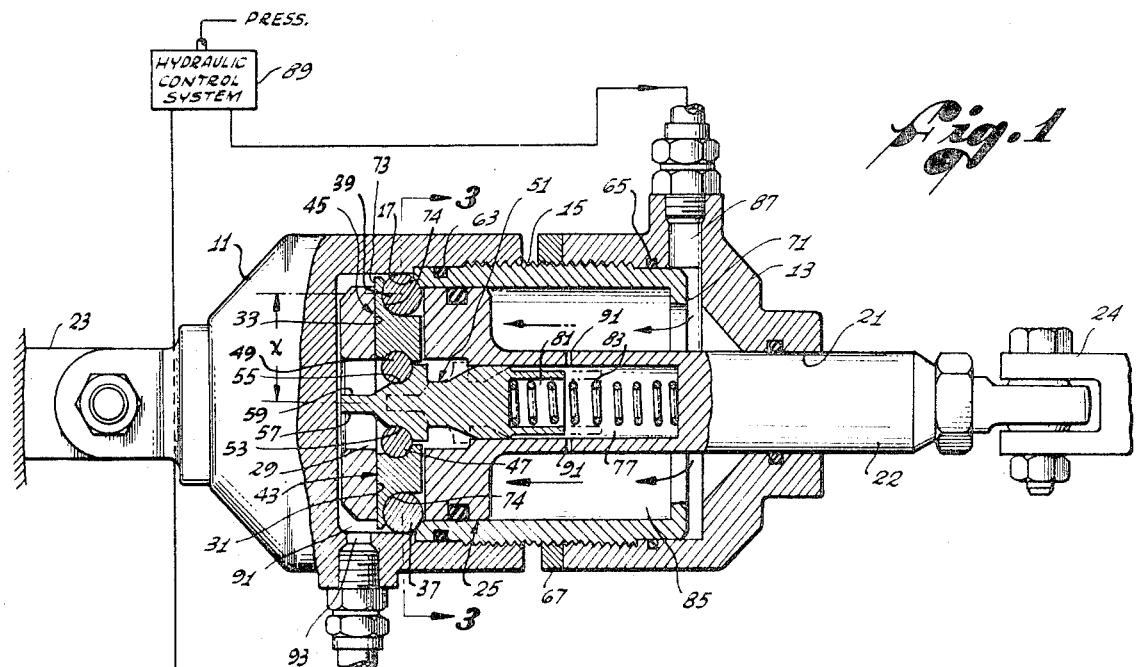
Fig.1
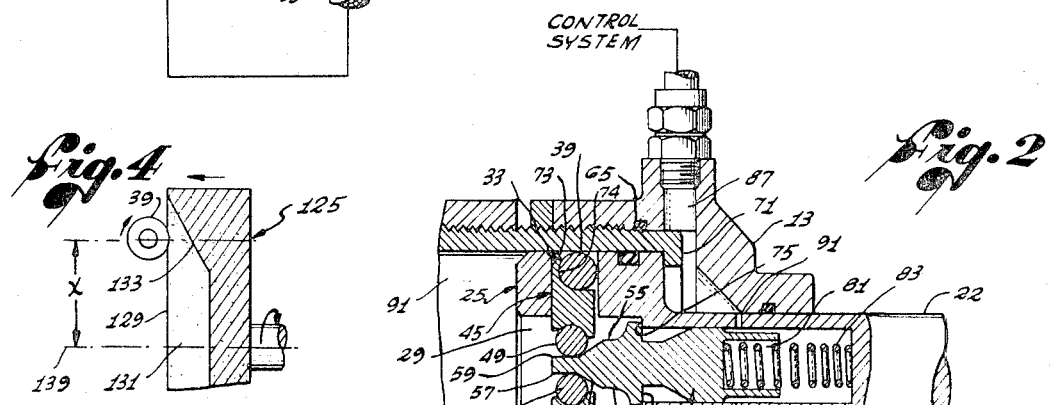
Fig.2
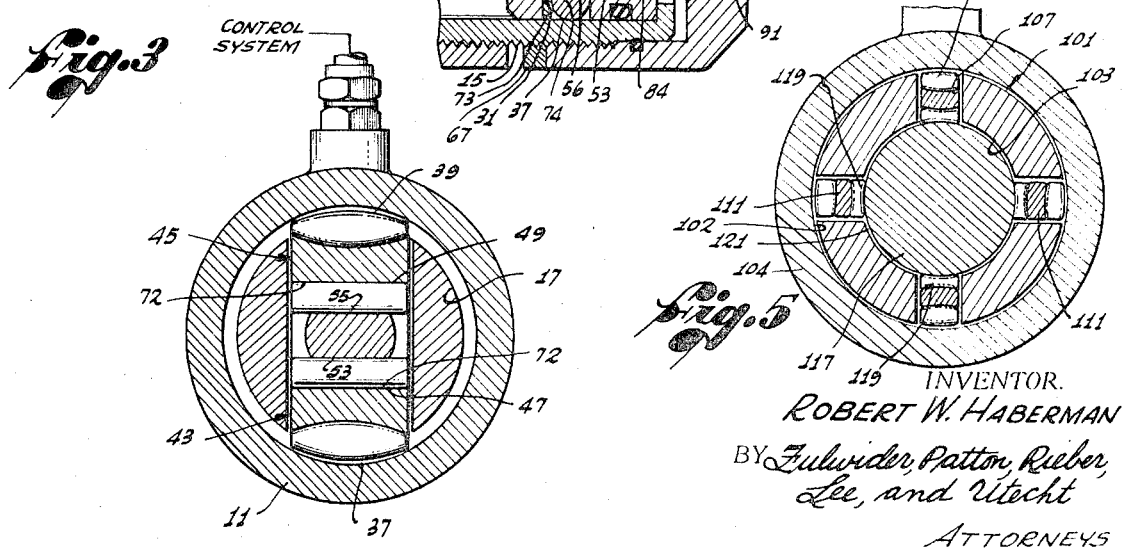
Fig.4
Fig.3
Fig.5
INVENTOR.
ROBERT W. HABERMAN
BY Fulwider, Patton, Rieber,
Lee, and Utecht
ATTORNEYS

LOCKING MECHANISM

BACKGROUND OF THE INVENTION

1. The present invention relates generally to locking mechanisms for movable members such as hydraulic operators.

2. Prior-art locking and connecting mechanisms have utilized balls, lugs, fingers and the like which move radially outwardly and inwardly in slots formed in an operator to selectively engage an annular stop carried by a complementary cooperating member. Each of the balls, lugs and fingers of the prior-art devices generally abut the annular stop at only one point thereby resulting in the entire separation force on the mechanism being resisted at points of contact, thus creating high stresses which effect failure of the mechanism. The present invention overcomes this shortcoming by providing for elongated line contact between convex locking rollers and a frustoconical stop surface thereby distributing the locking force.

SUMMARY OF THE INVENTION

The locking mechanism of present invention is characterized by symmetrically disposed, elongated, convex rollers movable into and out of locking engagement with a frustoconical stop surface. The rollers are mounted on the outer ends of carrier segments reciprocable in radially extending slots in an operator axially movable in a hydraulic cylinder. The frustoconical stop surface extends at an angle to the cylinder wall and the slots are indexed therewith when the operator is in locking position.

A locking-unlocking actuator, which may be in the form of a piston inside the operator, has opposed bearing surfaces which register with the radially inward ends of the slots when the piston is in locking position. The carrier segments have rollers on their inner ends which engage these bearing surfaces to hold the segments and convex rollers outwardly in operation-locking position. The actuator piston has radially inward surfaces adjacent the bearing surfaces which receive the inner rollers thereagainst to permit the segments and convex rollers to move radially inward into unlocking position. Both the operator and actuator may be moved in one or both directions by hydraulic fluid pressure and movement in one direction of either or both of them may be by biasing forces.

The convexity of the locking rollers is such as to engage the frustoconical stop surface on a long line to give positive, high-strength locking.

The convex rollers are conveniently ground from cylindrical stock against a grinding wheel having a frustoconical surface of the same angle as the frustoconical stop surface, the stock rotating about an axis spaced from the axis of rotation of the grinding wheel the same distance as the roller axis in locking position is spaced from the axis of the operator cylinder.

Other objects and features of the invention will be apparent from the following description and the appended drawing.

BRIEF DESCRIPTION OF THE DRAWING

FIG. 1 is a side elevation view, partially broken away in longitudinal vertical section of a locking mechanism embodying the present invention in latched position;

FIG. 2 is a partial sectional view similar to FIG. 1, the locking mechanism being shown in its unlatched position;

FIG. 3 is a vertical sectional view taken along the line 3-3 of FIG. 1;

FIG. 4 is a diagrammatical view, partly in section, of the convex roller forming operation;

FIG. 5 is a vertical sectional view, similar to FIG. 3, and showing a second embodiment of the locking mechanism of this invention.

DESCRIPTION OF PREFERRED EMBODIMENTS

The locking mechanism shown in FIG. 1 includes a housing comprised of a pair of opposed cup-shaped portions 11 and 13 screwed onto opposite ends of an externally threaded coupling barrel 15, the left-hand end of the barrel 15 defining a frustoconical abutment stop surface 17. The right-hand housing portion 13 is formed with an axial bore 21 in its end through which a reciprocable operating link 22 projects. The left-hand housing portion 11 is pivotally mounted on a stationary bracket 23 and the reciprocable link 22 is pivotally connected to an actuated fitting 24.

A main operator piston, generally designated 25, is formed integrally with the inner end of the operating link 22 and has an inner axial bore 29 communicating with radially extending slots 31 and 33. A pair of carrier segments 43 and 45 are received in the slots 31 and 33 to be reciprocable therein and to carry a pair of elongated, convex locking rollers 37 and 39 into and out of locking positions relative to the stop surface 17. The rollers 37 and 39 are received in pockets 74 defined by flanges 73 at the outer ends of the carrier segments 43 and 45. The inner ends of the carrier segments have arcuate sockets receiving actuating rollers 47 and 49. The axes of the rollers 37, 39 and 47, 49 are transverse to the axis of the operator piston 25.

An actuator piston, generally designated 51, is reciprocally disposed in the axial bore 29 of the operator piston 25. The actuator piston 51 includes a relatively wide portion defining a pair of oppositely disposed, bearing surfaces 53 and 55, a wedge-shaped portion 56, and a projecting tongue defining a pair of flat bearing surfaces 57 and 59. The locking position of the operator piston 25 is at the left-hand end of the housing, as shown in FIG. 1, at which time the slots 31 and 33 are indexed in back of the stop surface 17 whereby the actuator piston 51 can move to the left in the axial bore 29 engaging the actuating rollers 47 and 49 successively with the surfaces of the wedge-shaped portion 56 and the bearing surfaces 53 and 55 thereby forcing the carrier segments 43 and 45 and the locking rollers 37 and 39 carried thereby outwardly so that the locking rollers engage the frustoconical stop surface 17 and prevent movement of the operator piston 25 to the right in the barrel 15, as viewed in FIG. 1.

Retraction of the actuator piston 51 within the bore 29 to the position shown in FIG. 2, registers the flat bearing surfaces 57 and 59 with the actuating rollers 47 and 49 to permit the carrier segments 43 and 45 and locking rollers 37 and 39 to retract in the slots 31 and 33 whereby the locking rollers clear the stop surface 17 and free the operator piston 25 to move toward the right and into the unlocked position shown in FIG. 2.

With further reference to FIG. 1, the coupling barrel 15 is formed with an exterior groove adjacent the end defining the stop surface 17 to receive an O-ring 63 which seals against the inner surface of the housing portion 11. The opposite end of the barrel 15 is sealed against an O-ring 65 carried in a groove formed in the interior wall of the housing portion 13. A locknut 67 secures the housing portion 13 to the barrel 15. The right-hand end of the barrel 15 is formed with a radially extending flange stop 71.

The axial bore 29 in operator piston 25 is counterbored to define a shoulder 75 engaged as a stop by a flange 84 on the actuator piston 51. The right-hand end of actuator piston 51 has a bore 81 receiving one end of a compression spring 83 whose opposite end abuts against the end of the bore 29 to bias the actuator piston 51 toward locking position.

The housing portion 13 and barrel 15 cooperate to form a pressure chamber 85 on the right-hand side of the operator piston 25 whereby hydraulic fluid may be introduced through a passage 87 from a hydraulic control system 89 to thereby force the operator piston 25 to the left in a working stroke. A second hydraulic chamber 91 is formed on the left-hand side of the operator piston 25 in the housing portion 11 and includes an inlet passage 93 for introduction of hydraulic fluid from the control system 89 to subject the actuator piston 51 to pressure to drive it into unlocking position against the bias of spring 83. The pressure in chamber 91 also moves the operator piston 25 to the position of FIG. 2, after the locking rollers 37 and 39 move inwardly of the stop surface 17.

The bore 29 communicates with the hydraulic chamber 85 through bleed ports 91 to prevent trapping of fluid therein.

The locking mechanism shown in FIG. 5 is similar to the mechanism shown in FIGS. 1 through 3 except that it utilizes four locking rollers rather than two. The operator piston, generally designated 101, reciprocates in a cylindrical chamber 102 formed by a housing 104. The operator piston 101 has an axial bore 103 communicating with four radially extending slots 107 arranged in oppositely disposed pairs. Carrier segments 111 are reciprocally disposed in the slots 107 and support convex locking rollers 109 are their outer ends. The inner ends of segments 111 receive concave actuating rollers 119 which are engaged by the cylindrical bearing surface 121 of an actuator piston 117 with an arcuate line contact. In the embodiment of FIG. 5 the actuator piston has an outer portion of reduced diameter, not shown, engaged by the concave actuating rollers 119 to permit the carrier segments 111 and locking rollers 109 to move inwardly into unlocking position. The convex locking rollers again engage a frustoconical stop surface like 17 with a line contact.

A convenient method of forming the desired convexity on rollers 37, 39 and 109 is shown in FIG. 4. A grinding wheel 125 includes a cavity 131 defined by an interior frustoconical surface 133 having the same angle to the axis 139 of the wheel as the surface 17 has to the axis of the operator piston. The convex rollers 37, 39 or 109 may be formed from rod stock which is supported at a distance X from the axis of rotation 139 of the wheel 125 and at right angles thereto. The distance X is the distance from the axis of the operator piston 25 to the axes of the locking rollers 37, 39 when in locking position abutting the stop surface 17, as shown in FIG. 1. The stock is fed progressively toward the grinding wheel parallel to axis 139 while being rotated about its own axis to form a peripheral surface of the desired convexity as shown in FIG. 3.

From the foregoing it will be clear that the locking mechanism of the present invention is sturdy in construction and provides for positive and rigid locking. The interengagement of the convex surfaces of the locking rollers with the frustoconical stop surface gives elongated line contact to distribute the locking force and prevent high unit pressures, thus avoiding rapid wear and material failure.

While certain preferred embodiments of the invention have been specifically illustrated and described, it is understood that the invention is not limited thereto as many variations will be apparent to those skilled in the art, and the invention is to be given its broadest interpretation within the terms of the following claims.

I claim:

1. A locking mechanism comprising:
   a first member including a frustoconical stop surface;
   a second member coaxial with and movable relative to said first member along their axes, said second member having an axial opening therein communicating with oppositely disposed, radially outwardly extending slots, the outer ends of said slots being indexed adjacent said stop surface when said second member is in position to be locked relative to said first member;
   locking means including elongated convex rollers reciprocally disposed in said slots transversely to said member axes, the convexity of said roller surfaces being complementary to the curvature of said stop surface to effect locking engagement therebetween throughout substantially the length of said rollers;
   a locking actuator reciprocally mounted in said axial opening; and
   means on said actuator for moving said locking rollers in said slots into and out of interfering locking relation with said stop surface.

2. The locking mechanism defined in claim 1 including:
   carrier segments reciprocally mounted in said slots and mounting said convex locking rollers at their outer ends;
   and means on said locking actuator which in locking and unlocking positions thereof effects movement of said carrier segments outwardly and inwardly in said slots to move said locking rollers into locking and unlocking positions.

3. The locking mechanism defined in claim 2 including:
   actuating rollers mounted on said segments at the inner ends thereof;
   and cam surfaces on said actuator engaging said actuating rollers to effect movement of said carrier segments in said slots.

4. The locking means defined in claim 3 in which:
   said cam surfaces comprising first, radially inward, opposite bearing surfaces engaging said actuating rollers in the unlocking position of the actuator;
   second, radially outward opposite bearing surfaces engaging said actuating rollers in the locking position of said actuator;
   and inclined surfaces interconnecting said first and second bearing surfaces for engagement with said actuating rollers in the transition movement of the actuator between its locking and unlocking positions.

5. The locking mechanism as defined in claim 1 in which said first member includes a hydraulic cylinder and said second member includes a main operating piston movable therein, said locking actuator also comprising a piston;
   means constantly biasing said locking actuator in one direction;
   and a pressure port for admitting hydraulic pressure into said cylinder to first move said locking actuator against its bias into unlocking position and then move said operator piston in a working stroke.

6. The locking mechanism defined in claim 5 including:
   a pressure port for the opposite ends of said cylinder for moving said operator piston toward locking position in a working stroke.

7. The locking mechanism defined in claim 1 in which said slots are symmetrically disposed around the axis of said members to exert a balanced locking force between said members symmetrical with respect to their axes.

8. The locking mechanism defined in claim 7 in which said slots are arranged in diametrically opposite pairs offset 90°.

9. The locking mechanism defined in claim 4 in which:
   said actuating rollers are substantially cylindrical; and
   the bearing surfaces on said actuator are substantially flat and said inclined surface is substantially planar to provide line contact on said bearing and inclined surfaces by said actuating rollers.

10. The locking mechanism defined in claim 4 in which:
    said actuating rollers have concave peripheral surfaces; and
    at least the second, radially outward bearing surfaces on said actuator are complementary curved to provide elongated arcuate line contact with the surfaces of the actuating rollers.